Aug. 26, 1930. C. F. JENKINS METHOD OF AND APPARATUS FOR CONVERTING LIGHT IMPULSES INTO ENLARGED GRAPHIC REPRESENTATIONS Re. 17,784

Original Filed June 2, 1926

Inventor
CHARLES FRANCIS JENKINS
By Paul Carpenter
Attorney

Reissued Aug. 26, 1930

Re. 17,784

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

METHOD OF AND APPARATUS FOR CONVERTING LIGHT IMPULSES INTO ENLARGED GRAPHIC REPRESENTATIONS

Original No. 1,683,137, dated September 4, 1928, Serial No. 113,266, filed June 2, 1926. Application for reissue filed November 29, 1929. Serial No. 410,616.

This invention relates to methods and apparatus for converting electrical impulses into graphic representations particularly those transmitted at a rate of speed which when viewed by an observer will appear as the original representation of composites and in cycles of speed of transmission to give persistence of vision and the appearance of a moving object similar to that commonly known as moving pictures.

This invention is premised on the observation that visual representations may be converted into pulsating electrical current varying in intensity as fractional areas of a visual representation vary to predetermined areas thereof and that the current so transmitted may be reconverted into a pulsating light which may be distributed to display a visual representation, and the further observation that radio frequency oscillation may be utilized for obtaining pulsating effects whether transmitted through the ether, to avoid the distribution of conductors or over well defined paths of conduction commonly termed wired wireless.

The invention is further premised on the observation that rapidly pulsating light distributed over predetermined areas may be given the effect of a visual representation and the further observation that an exceedingly high degree of pulsation of current may be utilized to create a rapidly pulsating light which, in turn, may be distributed to display a visual representation through the agency of light confining or conducting elements.

This invention therefore has for an object thereof the provision of a method for converting a primary pulsating light of intensity varying as fractional areas of a visual representation vary to predetermined portions thereof, and distributing said light to conducting or confining elements so that there is presented a visual representation or light arranged to display a reproduction of the original image, or a record energized by said light conductors or confining elements representing the original.

The invention further contemplates the provision of a method of converting a pulsating light varying in intensity as fractional areas of the visual representation vary to predetermined areas thereof, by converting the light thereof through the use of light confining or conducting elements arranged to display light within limits giving persistence of vision, thus giving a composite simulating a reproduction of the original image. The invention also contemplates transmitting light impulses in cycles of composite visual representations so that light confining and conducting elements arranged to display corresponding light pulsations will give not only persistence of vision of a composite but also various phases of the composite giving the effect of what is commonly termed moving pictures.

The invention still further contemplates distributing pulsating light varying in intensity as fractional areas of the visual representation vary to the predetermined areas thereof, to a plurality of light confining and conducting elements which are given a speed of movement to give within limited areas impulses of light displays at the rate giving persistence of vision simulating a composite representation.

In the more particular embodiment of my invention provision is made to convert pulsating current varying in intensity as fractional areas of a visual representation vary to predetermined areas thereof, to light having equivalent pulsations, interruptions and variations in intensity, and distributing the light thereof to light conducting and confining elements, the method including arcuately moving said elements so that parts thereof describe a series of parallel arcs, the length of the radii thereof varying as the radial displacements of a spiral relatively to the center, whereby a composite representation will be presented. The method also includes converting the pulsations of current and the light generated thereby in cycles representing various composites, whereby varying composites will give the appearance of what is commonly termed motion pictures.

In a still further particular embodiment provision is made to convert pulsating current varying in intensity as fractional areas of a visual representation vary to predetermined areas thereof, to light having equivalent pulsations, interruptions and variations in intensity, and distributing the light to light conducting or confining elements which are arranged to display within limited areas a composite representation simulating the original, whether due to the light itself, a reflection thereof or a temporary indication, or a more or less permanent record.

The invention still further has for an object thereof, the provision of a device for transmitting visual representations by combining with means capable for furnishing a pulsating current varying in intensity as fractional areas of a visual representation vary to predetermined areas thereof, of a light generating element adapted to be energized by the pulsating current and having equivalent pulsations, interruptions and variations in intensity and display elements for said light pulsations having persistence of vision simulating the original, whether due to the light itself, a reflection thereof, or a temporary indication or a more or less permanent record.

The invention contemplates as an object thereof the provision of a device in combination with means for producing a pulsating current, of light energized by said current and having equivalent pulsations, interruptions and variations in intensity, and light conducting and confining elements displayed parallel lines having persistence of vision and simulating a visual representation of a character similar to the original.

In a more particular embodiment of my device visual representations are presented by combining with an electrical circuit adapted to supply a pulsating current varying in intensity as fractional representations of a visual representation vary to predetermined areas thereof, of a light generating element energized by said current and of a plurality of light conducting and confining elements mounted for rotatable movement with reference to said light generating element to display pulsations of light in a transverse plane whereby a composite representation will be presented within limited areas, the apparatus contemplating receiving cycles of pulsations representing composites in degrees of variations having persistence of vision and simulating a series of representations of a character commonly termed motion pictures, whether due to direct display of the light itself, a reflection thereof or of a temporary indication or a more or less permanent record.

It is further contemplated by means of the device herein provided to magnify the visual effects of light pulsations by extending the same over a length of path, thus giving apparent greater persistence of vision, and distributing the same over an area, thereby simulating a visual composite of the original without altering the spaced time relation of the pulsations or their original intensity. This I may accomplish by directing light pulsations through a plurality of light conducting and confining elements, including vitreous material, as quartz, borosilicates, ordinary glass and similar light conducting bodies and elements having internal reflecting properties capable of transmitting light, without substantial loss, characteristic of tubes made of glass, polished metal, or the like, from a single light source which appears at the original point of observation to be incapable of displaying any variation in intensity or pulsation.

It is further contemplated, to produce an image of any desired size, in a transverse plane, by distributing the light to light confining elements arranged in a helical path and collected from a single point, the number of light confining elements being increased in number in accordance with the desired definition, and the number of points increased in number in accordance with either the size of the point of observation and the speed of responsiveness of a light element to pulsate light in accordance with variations in intensity of fractional areas of visual representations to predetermined areas thereof. Thus also it is contemplated to have the minimum number of light pulsating elements within a relatively large display area and to also obtain an extremely high number of display elements or display surface energizing elements to obtain maximum definition at the display area.

It is still further contemplated to provide a light source energized by a pulsating current varying in accordance with predetermined signals or preferably varying in intensity as fractional areas of visual representations vary to predetermined portions thereof, so that they may be reproduced without mechanical, electrical or other inherent physical properties of the apparatus which may fail to cause the light source to faithfully reproduce the current impressed upon said light source. The more specific and preferred embodiment includes a plurality of light elements each successively energized so that any predetermined size of visual representation may be transmitted and received, and at the same time the light elements will only be energized in accordance with their ability to faithfully reproduce the pulsations of current energizing the light producing elements, so that effects due to lag in bringing the elements to the desired lighting effect and speed of responsiveness will be substantially eliminated.

It is still further contemplated that light pulsations varying in accordance with predetermined variations representing signals, or as fractional areas of visual representations vary to predetermined areas thereof, be displayed directly or upon a screen, recording means or the like, at speeds within persistence of vision representing the original visual representation, the light being transmitted rectilinearly and without substantial loss by direct conduction to the display screen or place to be viewed and without the requirement of careful adjustment, concentration or focusing light beams.

It is still further contemplated to provide a light responsive element adapted to be energized under similar conditions so that enlarged visual representation may be obtained from the pulsation thereof and with substantial uniformity and faithfulness of reproduction simulating the original.

In the preferred embodiment, a plurality of elements responsive to energization or actuation by electrical currents and capable of reproducing pulsations of varying intensity with the requisite rapidity to transmission of visual representation, within limits of persistence of vision capable of presenting them as moving pictures or the like, are enclosed under similar reactive conditions by maintaining the same in a gaseous envelope, maintained under proper pressures, in order that each element will faithfully reproduce the current impressed thereon, and the number of elements may be increased in number as desired to obtain an enlarged visual representation.

The invention still further contemplates as an object thereof the provision of apparatus for translating and magnifying a pulsating light source of variations in intensity as fractional areas of a visual representation vary to predetermined areas thereof, to a single composite within limits of persistence of vision appearing as the original moving or changeable object or visual representation, the translation or magnification being effected with simplicity of construction and without distortion. Generally a pulsating light and light display means and/or elements are arranged to move relative to each other so as to progressively traverse predetermined areas giving within such areas predetermined composites which within limits of persistence of vision, may be changed and varied in character to represent a moving visual representation or what may be termed a moving picture.

In the attainment of the foregoing objects, together with such further objects and additional benefits and advantages as may hereinafter appear or be pointed out, I have provided a construction one embodiment of which is illustrated in the accompanying drawings, wherein:

Fig. 3 is a detail hereinafter referred to.

Figure 1:
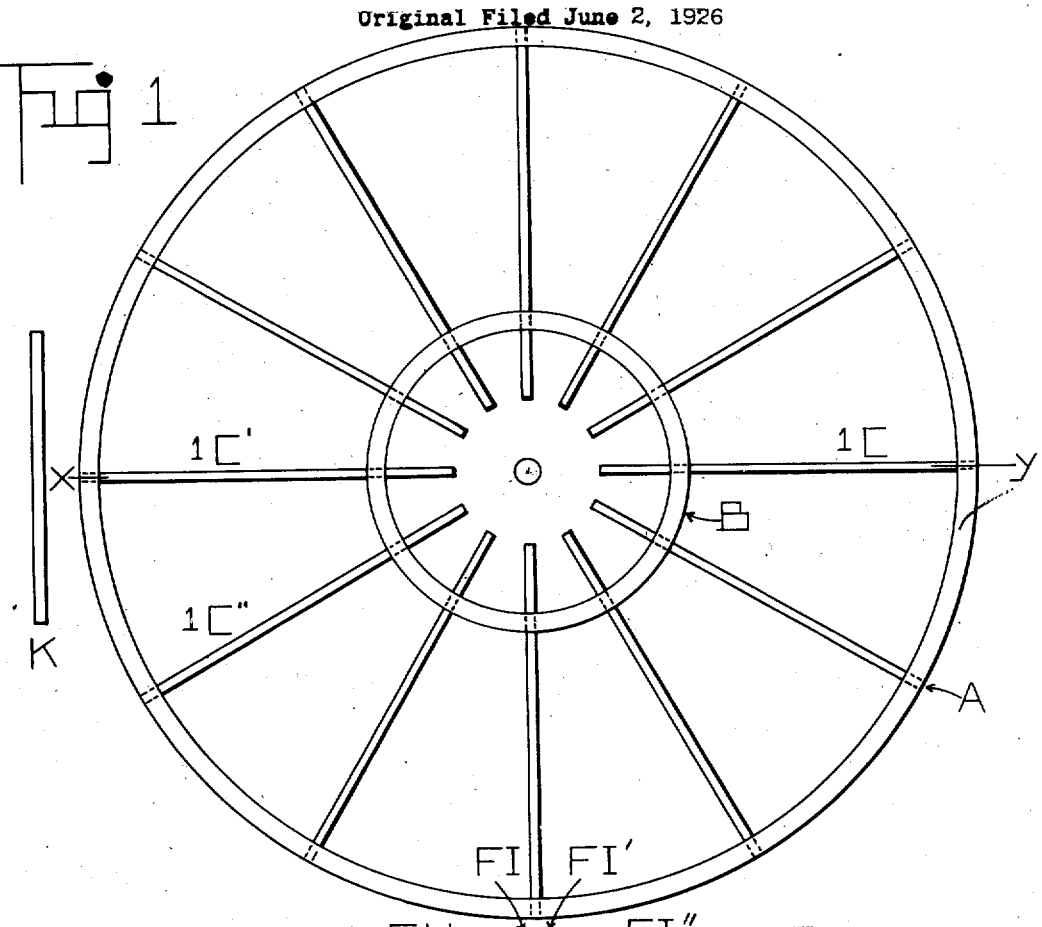
Figure 1 is a plan view of my device with certain elements omitted.
Figure 2:
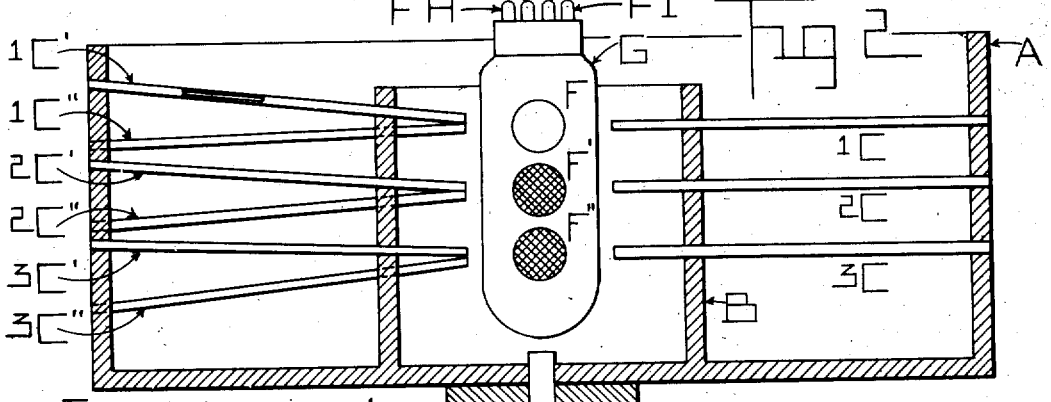
Figure 2 is a sectional view of my device taken in the direction of the line $x$—$y$ of Figure 1.
Figure 3:
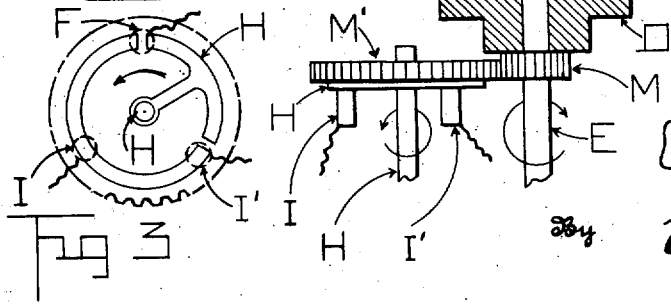

In the practice of the invention, a receiving device is provided preferably capable of being controlled by radio-frequency oscillations generated by a sending station commonly used for wireless telephony to obtain pulsating current varying in intensity as fractional areas of a visual representation vary to predetermined portions thereof and converting the same into light impulses. It will be understood, however, that the receiving device may be controlled by a transmitting station making use of one or more conductors other than the ether for generating the pulsating currents of the character mentioned and for certain purposes the so-called "wired-wireless" circuits may be utilized.

The pulsations of current utilized are not only of a character varying in intensity as regards a single composite visual representation but may be in cycles of pulsations representing a series of variations of visual representation transmitted at a speed within limits giving persistence of vision and simulating various stages of what is commonly referred to as motion pictures.

The pulsations of current so received are used to energize a light generating element which as to the light whereof is arranged to be distributed over an area whereby the pulsations thereof give persistence of vision representing—a composite visual representation simulating in character that of the original. The impulses of light may be utilized directly but in order to magnify the same when concentrated at a single light generating element, the pulsations thereof are distributed to a light confining or conducting element moving rapidly relatively to said light preferably made of vitreous material such as quartz, boro-silicates, glass or the like which are adapted to conduct the light substantially unaltered in dimension at their terminals. Terminals so displayed as a result of light conducted therethrough may, in themselves, give a visual representation simulating the original or they may be reflected upon a screen to give a temporary indication or a more or less permanent record by impressing the light impulses upon a photo-chemical plate or film.

In the preferred embodiment of my invention, the method of picture transmission includes distributing pulsations of current of the character referred to, to a light generating element which is caused to produce light having equivalent pulsations, interruptions and variations as the energizing current and distributing said light to a plurality of light conducting and confining elements whose termini move in a series of parallel lines within a limited area, giving persistence of vision representing a composite visual image.

For the practice of the method above described, I have utilized a device adapted to receive pulsations of current and for this purpose I may utilize well known radio receiving apparatus, which is arranged to convert the transmitted currents of radio frequency oscillation into corresponding currents capable of energizing a light generating element. The output of the receiver is led to a light generating element by means of suitable conductors. Preferably a light element or lamp is utilized which has a high frequency light change value and capable of responding to very small radio currents.

On referring to the drawings, it will be observed that mounted within a cylindrical member A having a concentric flange B, there are supported a plurality of light conducting elements C in the form of rods, tubes, or the like having the property of confining or conducting light without substantial loss and in an unmodified condition. These elements are disposed so that the axes of the tubes or rods lie in a surface of generation of a helix or screw. In the example shown, the pitch of the helix or screw is such as to make three complete turns within the length of the cylindrical member A. The rods or tubes C included within the first turn are designated 1C, 1C′, 1C″ etc., the rods or tubes included within the second turn are designated 2C, TC′, 2C″, etc., whereas the rods or tubes included within the third turn are designated 3C, 3C′, 3C″, etc. These rods may be increased in number, as well as the number of turns may be increased, in accordance with the results desired, in a manner which will be amplified as this description proceeds.

Each of the radially and helically disposed rods or tubes is arranged to have its axial end disposed towards a source of light energized in the manner herein above described and herein designated as F, preferably however this light source F includes a plurality of light points or illuminating spots corresponding to the number of turns of the helix or screw of the radially arranged rods or tubes and of a size such that their total illuminating surface will be sufficient to supply the helical or screw arranged rods at their display ends or periphery of the cylinder for the complete cycle of operation.

It will be observed that light projected at the axial or central portion of the light confining and conducting elements C will be projected and conducted without appreciable loss to the peripheral ends. It will further be observed that in the preferred form shown as the cylindrical drum rotates these outer or peripheral ends will successively pass some point of observation, in the order 1C, 1C′, 1C″, etc.; then 2C, 2C′, 2C″, etc.; then 3C, 3C′, 3C″, etc.

In order to observe within limited areas the lighting effects at the peripheral ends of the light confining tubes or rods, I provide at some point a screen or display surface K, of a length equal substantially to the displacement of a turn or number of turns of the helix or screw forming a cycle of projection and observation, and of a width as desired to give display without substantial distortion. at the edges thereof, the light projected upon it.

It will be observed that it is preferred to supply a light element G with pulsating current to actuate the same in accordance with variations in intensity of fractional areas of a visual representation of predetermined areas and in cycles of composites and speeds so that within limits the analysis will be equivalent to that of motion picture projection. Accordingly the cylinder A is rotated so that the revolutions thereof correspond to the cycle of transmission of composites.

As above described, it is preferred that observation be made for a limited area at the periphery of the cylinder and for this reason the light element is energized and or arranged to display the pulsating light by commutating, screening, masking or otherwise only over a small angular displacement of the cylinder, and in the illustration shown for an angular displacement of approximately 30°. For this purpose the cylinder A mounted for rotation upon the hub D and shaft E is arranged to operate by the gears M and M′, the commutator having a live sector H connected to the ground connecting shaft H′. This live sector H is arranged to make contact with the brushes I, I′, I″ (not shown) which by suitable conductors are connected to the corresponding contacts FH′ (the ground connection) FI, FI′, FI″ in succession.

The gears M, M′, are so arranged in ratio as to the number of spots of lighting elements F, F′, F″, where such are used, as there are of such elements. It will be observed that these spots are energized in succession, but may be substituted by a single source energized in accordance with cycles of transmitted composites, or where the inner axial ends, are also arranged helically, the spots F, F′, F″ may be produced by suitably masking the envelope including the light source. Preferably a plurality of light producing elements are used which are in number equivalent to the number of turns in the helix. The benefit thereof, where these elements are in the same gaseous envelope, not only gives uniformity of results, giving equalization of the visual representation, but also assures that the element energized by the current reproduces the pulsations impressed thereon without difficulties due to lag by reason of the inherent physical properties of the light element and its ability to respond to energization by the pulsating current. In the construction shown herein, I use separate elements each of which is permitted to operate and display pulsating light within limits giving faithful reproduction.

It will thus be observed that I have provided a method for not only enlarging the light pulsations to any desired magnitude but one wherein as the light emerges from the light conforming and conducting rods or tubes and is displayed or projected upon the screen K completely covers the same in a series of parallel lines, varying in intensity and size to represent the corresponding fractional area of the original visual representation. The speed of scanning will be such as to complete a composite within speeds giving persistence of vision. Also the composites will be imposed, when such results are desired, to rapidly change in nature representing various forms of a moving visual representation, which when displayed seriatim will portray the original moving object.

Having thus described my invention and illustrated its use, what I claim as new and desire to secure by Letters Patent is:

1. In a device for transmitting visual representations, the combination with a light source adapted to supply a pulsating light varying in intensity as fractional areas of a visual representation vary to predetermined areas thereof, of a plurality of light confining rods having the ends thereof helically arranged and rotatably mounted relatively to said light source and adapted to display the pulsations of said light in a composite visual representation.

2. The method of scanning a plane which consists in distributing light from a light source through a plurality of channels of sharp light boundary from end to end, and rotating the channels with the axes in separate planes.

3. The method of scanning a plane which consists in distributing light from a light source through a plurality of channels of sharp light boundary from end to end, and rotating the channels with their outer ends in a plurality of helices.

4. The method of scanning a plane which consists in distributing light from a light source through a plurality of channels of greater refractive boundary than the surrounding medium, arranged in separate approximately parallel planes during relative rotary movement of the channels and the light source.

5. The method of scanning a plane which consists in distributing light from a light source through a plurality of channels of greater refractive index than the surrounding medium, and rotating the channels in separate approximately parallel planes with their outer ends disposed in a plurality of helices.

6. The combination of a light source, a plurality of light conducting members arranged radially and distributing light from the light source, the said members having their outer end arranged in separate planes.

7. The combination of a light source, a plurality of light conducting members arranged radially and distributing light from the light source, the said members having their outer ends arranged in a plurality of helices.

8. The combination of a multiple light source, a plurality of light conducting members arranged radially in series and associated with the light sources to distribute light therefrom.

9. The combination of a multiple light source, a plurality of light conducting members arranged radially in a plurality of helices associated with the multiple light source for distributing light therefrom.

10. The combination of a light source, a plurality of rods arranged radially and disposed in separate approximately parallel planes and associated with the light source and distributing light therefrom, and means for rotating said rods.

11. The combination of a light source, a plurality of rods arranged radially in a plurality of helices and associated with the source of light for distributing light therefrom, and means for rotating said rods.

12. The combination of a multiple light source, a plurality of rods arranged radially in series associated with the light sources of said multiple light source for distributing light therefrom, and means for rotating the said rods.

13. The combination of a multiple light source, a plurality of rods arranged radially in a plurality of helices associated with the light sources of said multiple light source for distributing light therefrom, and means for rotating said rods.

14. The combination of a multiple light source, a plurality of rods arranged radially in a plurality of helices associated with the light sources of said multiple light source for distributing light therefrom, means for rotating said rods, and means for activating the light sources in succession.

15. The combination of a multiple light source, a plurality of rods arranged radially in series and associated with the multiple light souce for distributing light therefrom, means for rotating the said rods, and means for activating the light sources of said multiple light source in succession.

16. The combination of a light source, a rotatable cylinder, and a plurality of channels of greater refractive index than the surrounding medium extending from the light source to the cylinder for distributing light from said light source.

17. The combination of a light source, a rotatable cylinder, and a plurality of channels of greater refractive index than the surrounding medium extending from the light source to the cylinder for distributing light from the light source, said channels being arranged in separate planes.

18. The combination of a light source, a rotatable cylinder, and a plurality of channels of greater refractive index than the surrounding medium extending from the light source to the cylinder for distributing light from the light source, said channels being arranged in a plurality of helices around the cylinder.

19. The combination of a light source, a hollow rotatable cylinder, and a plurality of channels extending from the light source to a wall of the cylinder for distributing light from the light source.

20. The combination of a light source, a rotatable cylinder, and a plurality of relatively long channels of greater refractive index than the surrounding medium carried by the cylinder and associated with the light source for distributing light therefrom and disposed in a plurality of helices around the cylinder.

21. The combination of a source of light, a rotatable cylinder, and a plurality of rods carried by the cylinder and supported adjacent their inner and outer ends, and associated with the source of light to distribute light therefrom.

22. The combination of a source of light, a rotatable cylinder, and a plurality of rods carried by the cylinder and radially arranged and supported at their inner and outer portions and associated with the light source for distributing light therefrom.

23. The combination of a rotatable cylinder, a multiple light source having its light sources disposed longitudinally with respect to the axis of the cylinder, and a plurality of series of rods carried by the cylinder, each series being associated with a separate light source for distributing light therefrom.

24. The combination of a rotatable cylinder, a multiple light source having its light sources disposed longitudinally with respect to the axis of the cylinder, a plurality of series of rods carried by the cylinder, each series being associated with a separate light source for distributing light therefrom, and means for activating the light sources in succession.

25. A cylinder-like scanning member having a plurality of scanning elements arranged in more than one complete turn around the periphery of said member, and a commutator for rendering each turn of elements successively effective in optical translation.

26. A cylinder-like scanning member having a plurality of scanning openings arranged in a plurality of convolutions about the periphery of said member, and a commutator for rendering each convolution of openings successively effective.

27. A television scanning device comprising a drum having a plurality of scanning elements arranged in a plurality of helical convolutions about the periphery of said drum, a light spot for each helical turn, and means for rendering the light spots successively effective.

28. A television scanning device comprising a hollow drum having a plurality of scanning openings arranged in the path of a plural-turn helix about the periphery of said drum, and a commutator for rendering each turn of elements successively effective in optical translation.

29. In a television device the combination of a hollow drum having a plurality of openings in the wall thereof and extending more than one complete turn around the periphery of said drum, a member mounted within said drum, means for controlling the response of said member in accordance with the shade characteristics of elemental areas of a visual representation, and a commutator for rendering each turn of elements successively effective in optical translation.

30. In a television device the combination of a hollow drum having a plurality of openings in the wall thereof and arranged in a plurality of convolutions about the periphery of said drum, and a reproducing light source within said drum for producing a plurality of light spots one for each convolution of openings, and means for rendering said light spots separately effective in optical translation.

31. In a television device a hollow drum having a series of openings in the wall thereof arranged in a plurality of convolutions, a reproducing light, an image field adapted to be illuminated by said light, means for rotating said drum a plurality of complete turns to effect a single complete scanning of the entire image field, and switching means for rendering separate portions of said light successively effective in illuminating said image field.

32. In a television device a hollow drum having a series of openings in the wall thereof arranged in a plurality of convolutions about said drum, and switching means for rendering each convolution of openings successively effective in scanning.

33. A television device according to claim 32 in which the means for rendering each convolution effective includes a plurality of light spots, and a commutator for rendering said spots separately effective.

34. In a television system employing a hollow drum scanner the method of scanning an image-field which comprises rotating said drum a plurality of complete revolutions to effect a single complete scanning of the entire picture field, and illuminating selected portions of said drum only during each revolution, the portions illuminated during successive revolutions being different.

In testimony whereof I have hereunto set my hand on this 14th day of June, 1930.

CHARLES FRANCIS JENKINS.